US006606490B1

(12) United States Patent
Rainish et al.

(10) Patent No.: US 6,606,490 B1
(45) Date of Patent: Aug. 12, 2003

(54) BATTERY OPERATED RADIO RECEIVERS HAVING POWER SAVE BY REDUCING ACTIVE RECEPTION TIME

(75) Inventors: Doron Rainish, Ramat Gan (IL); Daniel Yellin, Ra'anana (IL); Paul Spencer, Bet Shemesh (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/371,276

(22) Filed: Aug. 10, 1999

(51) Int. Cl.[7] .............................. H04B 1/16; H04B 7/212
(52) U.S. Cl. .................... 455/343; 455/574; 340/10.34; 370/347
(58) Field of Search .............................. 455/343, 38.3, 455/127, 574, 135; 370/311, 330, 337, 347, 324, 458, 459, 468; 340/7.31, 7.32, 7.34, 825.2, 10.34

(56) References Cited

U.S. PATENT DOCUMENTS

| 4,839,639 A | * | 6/1989 | Sato et al. ............. 340/825.44 |
| 5,152,006 A | * | 9/1992 | Klaus ......................... 455/574 |
| 5,241,542 A | * | 8/1993 | Natarajan et al. ........... 370/311 |
| 5,252,963 A | * | 10/1993 | Snowden et al. .......... 340/7.34 |
| 5,265,270 A | * | 11/1993 | Stengel et al. .............. 455/343 |
| 5,361,276 A | * | 11/1994 | Subramanian ............... 375/200 |

(List continued on next page.)

FOREIGN PATENT DOCUMENTS

WO      WO 98/44670      10/1998

OTHER PUBLICATIONS

" Multiple Dwell Serial Search: Performance and Application to Direct Sequence Code Aquisition" by David M. DiCarlo and Charles L. Weber, IEEE Transaction on Communications, vol. Com–31, No. 5, pp. 650–659, May 1983.

U.S. patent application Ser. No. 09/780,470, Edlis et al., filed Feb. 12, 2001.

U.S. patent application Ser. No. 09/778,818, Edlis et al., filed Feb. 8, 2001.

U.S. patent application Ser. No. 10/197,212, Rainish et al., filed Jul. 18, 2002.

Primary Examiner—Charles N. Appiah
(74) Attorney, Agent, or Firm—Eitan, Pearl, Latzer & Cohen Zedek, LLP.

(57) ABSTRACT

A battery-powered portable radio receiver and a method of operating the battery-powered radio receiver during Standby Mode in order to decrease battery-current drain is provided. In Standby Mode, a receive path of the radio receiver is activated during a data-detection time interval for the detection of data destined for selected receivers, and a preconditioning time interval for performing pre-conditioning functions with respect to the receiver before the data-detection time interval. The method includes: (a) activating the receive path at a predetermined time instant before the start of the data-detection time interval to perform the pro-conditioning functions with respect to the receiver, (b) detecting a predetermined characteristic of the received signal affected by each of the pre-conditioning functions; (c) comparing each of the predetermined characteristics with e threshold; (d) where the predetermined characteristics are within their respective thresholds, deactivating the receive path until the start of the data-detection time interval, and then reactivating the receive path fur the data-detection time interval; and (e) where the predetermined characteristics are outside their respective thresholds, continuing the pre-conditioning functions until the predetermined characteristics are within their respective thresholds, then deactivating the receive path until the start of the data-detection time interval, and then reactivating the receive path for the data-detection time interval.

26 Claims, 6 Drawing Sheets

U.S. PATENT DOCUMENTS

| | | | |
|---|---|---|---|
| 5,392,287 A | * 2/1995 | Tiedemann et al. | 340/7.34 |
| 5,448,774 A | * 9/1995 | Yokozaki et al. | 455/343 |
| 5,471,655 A | * 11/1995 | Kivari | 455/127 |
| 5,535,207 A | * 7/1996 | Dupont | 370/433 |
| 5,551,078 A | * 8/1996 | Connell et al. | 455/343 |
| 5,561,848 A | * 10/1996 | Minami | 340/7.22 |
| 5,627,882 A | * 5/1997 | Chien et al. | 455/464 |
| 5,629,940 A | * 5/1997 | Gaskill | 340/7.35 |
| 5,678,227 A | 10/1997 | Connell et al. | |
| 5,708,971 A | 1/1998 | Dent | |
| 5,737,322 A | 4/1998 | Burbidge et al. | |
| 5,740,517 A | * 4/1998 | Aoshima | 340/7.34 |
| 5,754,583 A | * 5/1998 | Eberhardt et al. | 375/200 |
| 5,822,689 A | 10/1998 | Hwang | |
| 6,088,576 A | * 7/2000 | Sone | 340/7.33 |
| 6,108,324 A | * 8/2000 | Brown et al. | 370/335 |
| 6,111,865 A | * 8/2000 | Butler et al. | 340/7.42 |
| 6,125,137 A | * 9/2000 | Wang et al. | 375/148 |
| 6,134,440 A | 10/2000 | Black | |
| 6,208,837 B1 | * 3/2001 | Koh et al. | 340/7.2 |
| 6,223,047 B1 | * 4/2001 | Ericsson | 455/517 |

* cited by examiner

BATTERY OPERATED RADIO RECEIVERS HAVING POWER SAVE BY REDUCING ACTIVE RECEPTION TIME

FIELD OF THE INVENTION

The present invention relates to radio receivers, such as cellular handsets and pagers, and particularly to battery operated radio receivers having power save by reducing the active reception time.

BACKGROUND OF THE INVENTION

Communication systems between a remote (base) station, and a mobile station or terminal, such as cellular phones and pagers, commonly Include a current-saving mode, usually called an Idle or Standby mode, in order to save battery power in the mobile terminals. In these terminals, the Standby mode consists of a relatively long "sleep" interval in which most of the terminal blocks of the mobile station are deactivated, and a relatively short "reception" interval In which the terminal is enabled to receive from the base station transmitted data, usually a paging or a broadcast message, which may be intended for the terminal. The mobile station checks whether this message is intended for itself, and according to its contents, decides an further actions, like going to the sleep phase, continuing the reception phase, etc. Prior to the data detection in the reception phase, there is a pre-conditioning or synchronization period in which the receiver pre-conditions the receive path for data detection, e.g., synchronizes to the correct gain, frequency, DC offset, timing, and/or to other parameters the receiver may need. Examples for such parameters are equalizer tap gains when an equalizer is employed, or "fingers" gains and delays when a "RAKE" receiver is employed, In the present systems of the foregoing type, the batteries provided in the receivers are generally capable of operating the receiver for a total Standby time of approximately 200 hours, and a total Talk time of approximately 2 hours before battery-recharging is required. It would be very desirable to increase this Standby time by decreasing the current drawings on the battery during this time.

Various techniques have been developed for reducing current drain in battery-operated receivers, as described, for example, in U.S. Pat. Nos. 5,708,971 and 3,737,322, but there is still a need to further decrease current drain particularly during the long "Standby" period.

BRIEF DESCRIPTION OF THE DRAWINGS

The present invention will be understood and appreciated more fully from the following detailed description taken in conjunction with the drawings in which.

DESCRIPTION OF THE PRIOR ART

Figure 1:
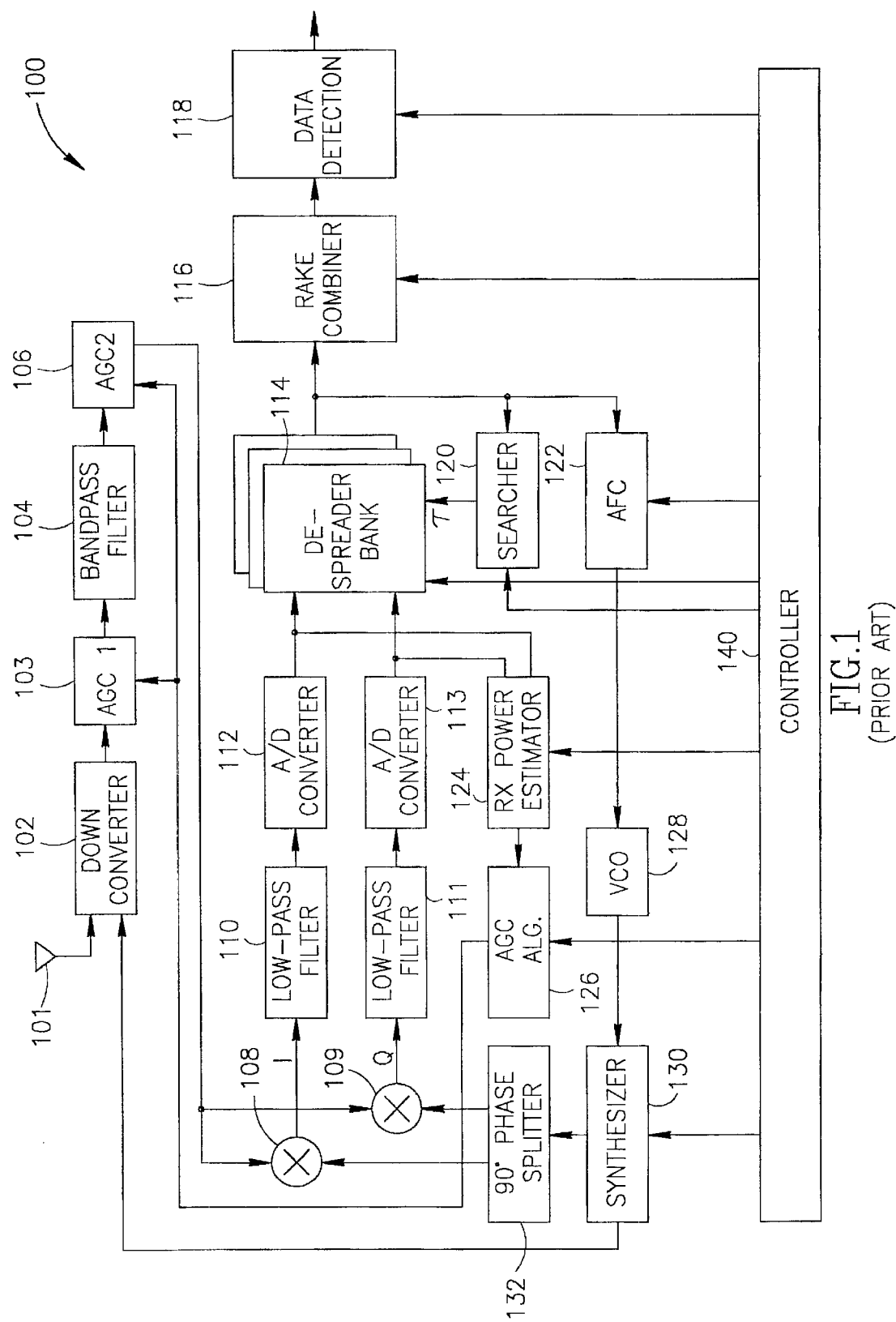
FIG. 1 is a schematic illustration of a prior art CDMA mobile station receiver.

FIG. 1 is a schematic block diagram of a typical mobile station direct sequence (CDMA) receiver 100 In accordance with the prior art. RF signals are received by an antenna 101, filtered, amplified and downconverted to an intermediate frequency (IF) by a downconverter 102, amplified by a first automatic gain control (AGC) circuit 103, filtered by a bandpass filter 104, typically a surface acoustic wave (SAW) filter, to eliminate signals outside the required bandwidth, and amplified by a second automatic gain control (AGC) circuit 106.

The amplified IF signals are multiplied by two IF sinusoidal signals generated by a synthesizer 130, and stuffed by 90° relative to each other by a phase splitter 132, to produce an in-phase signal I and a quadrature signal Q. The in-phase signal I is multiplied by a mixer 108, filtered by a low-pass filter 110 and digitized by an ND converter 112. Similarly, the quadrature signal Q is multiplied by a mixer 109, filtered by a low-pass filter 111 and digitized by an A/D converter 113. An AGC 126 is coupled to a power estimator 124 and to the first and second AGC circuits.

A searcher 120 performs the correlations needed to determine the various multipath delays $\tau$ inside the target window. The digitized signals are correlated, at the delays determined by searcher 120, by the correlators of a de-spreader bank 114, whose outputs are transferred to the searcher 120. The outputs of de-spreader bank 114 are combined, in a maximal ratio sense, in a rake combiner 116 and fed to the date detection unit 118 that performs de-interleaving and FEC decoding to produce the final output signal.

The automatic frequency control unit 122 processes the de-spreader bank output to determine the control voltage to he fed to a voltage controlled oscillator 128 (usually a voltage controlled crystal oscillator) which supplies a corrected frequency to the synthesizer unit 130. The synthesizer unit 130 generated the frequencies required to the phase splitter 132 and to the down converter 102 so the required frequency will be received. The controller unit 140 supplies working parameters and timing signal to the units.

Although a quadrature receiver is shown, other receiver types, such as those using IF sampling and other samplings, can be employed.

Figure 2:
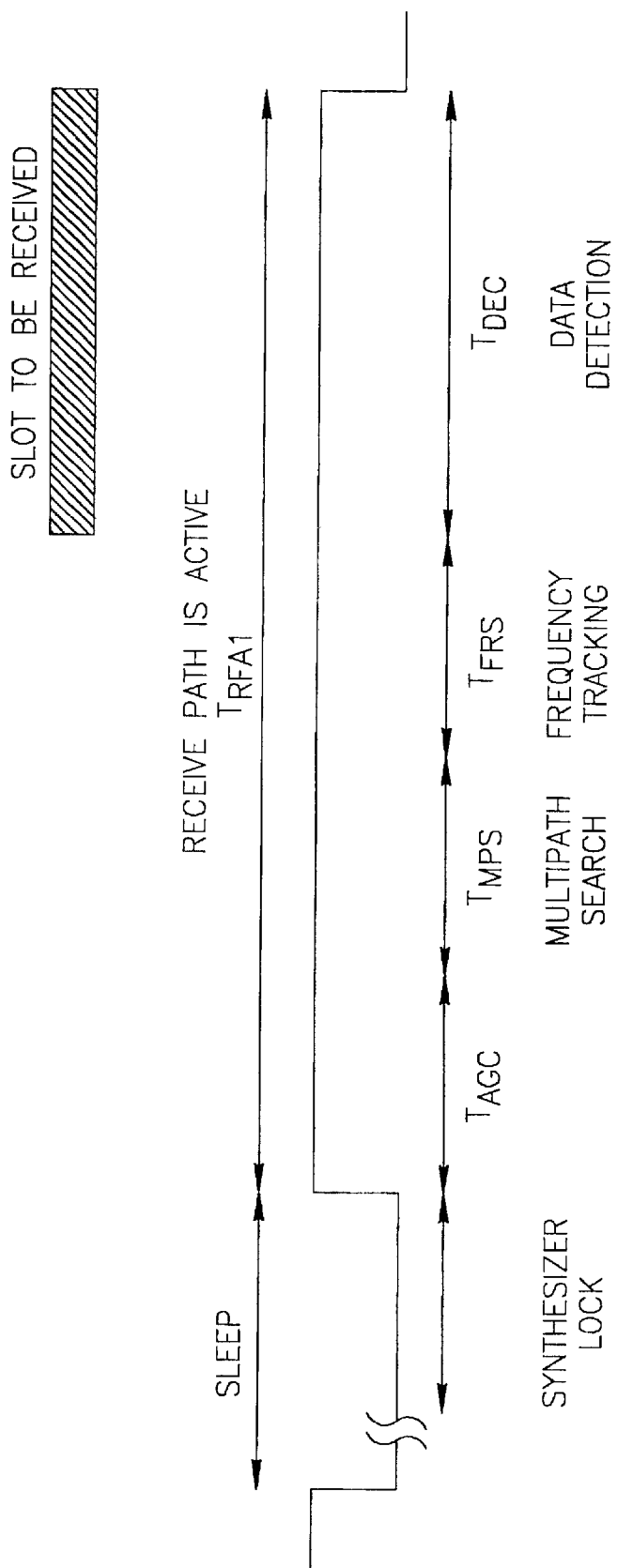
FIG. 2 is a timing diagram of the Standby period in the prior art receiver of FIG. 1.

FIG. 2 shows an example of reception timing during the Standby mode. The entire receive path of the radio is activated for time $T_{rfs1} - T_{AGC} + T_{mps} + T_{rfs} + T_{dec}$ where; $T_{AGC}$ is the time required for the AGC to settle; $T_{mps}$ is the time required for the multipath search (fingers positioning); $T_{frs}$ is the time required for the frequency tracking and $T_{dec}$ is the time require for data detection. Usually, $T_{AGC}$, $T_{mps}$ and $T_{frs}$ are designed to be long enough to cope with the worst case situation (i.e., bad channel conditions, large channel gain fluctuations, and/or wide multipath spread) since channel conditions and multipath spread are usually not known in advance when long sleep periods are used. Consequently $T_{mps}$ may (each durations of ~4–5 ms, and $T_{rfs}$ may reach duration of 1–2 ns, resulting in $T_{rfs1}$ which may be very long relative to $T_{dec}$. For example, $T_{dec}$ may be in the order of 60 μsecs but whereas $T_{rfs1}$ according to the prior art, may reach 5–7 mSecs Some prior art methods may perform multipath search in parallel to frequency tracking but they still have a long $T_{rfs}$ relative to $T_{dec}$.

DESCRIPTION OF PREFERRED EMBODIMENTS OF THE PRESENT INVENTION

The present invention overcomes the disadvantages of the prior art, by providing a novel method which reduces the wake up time of the radio section as well as the baseband section.

The present invention is particularly efficient for IS-95 CDMA idle applications, and is therefore described below with respect to such an application.

Figure 3:
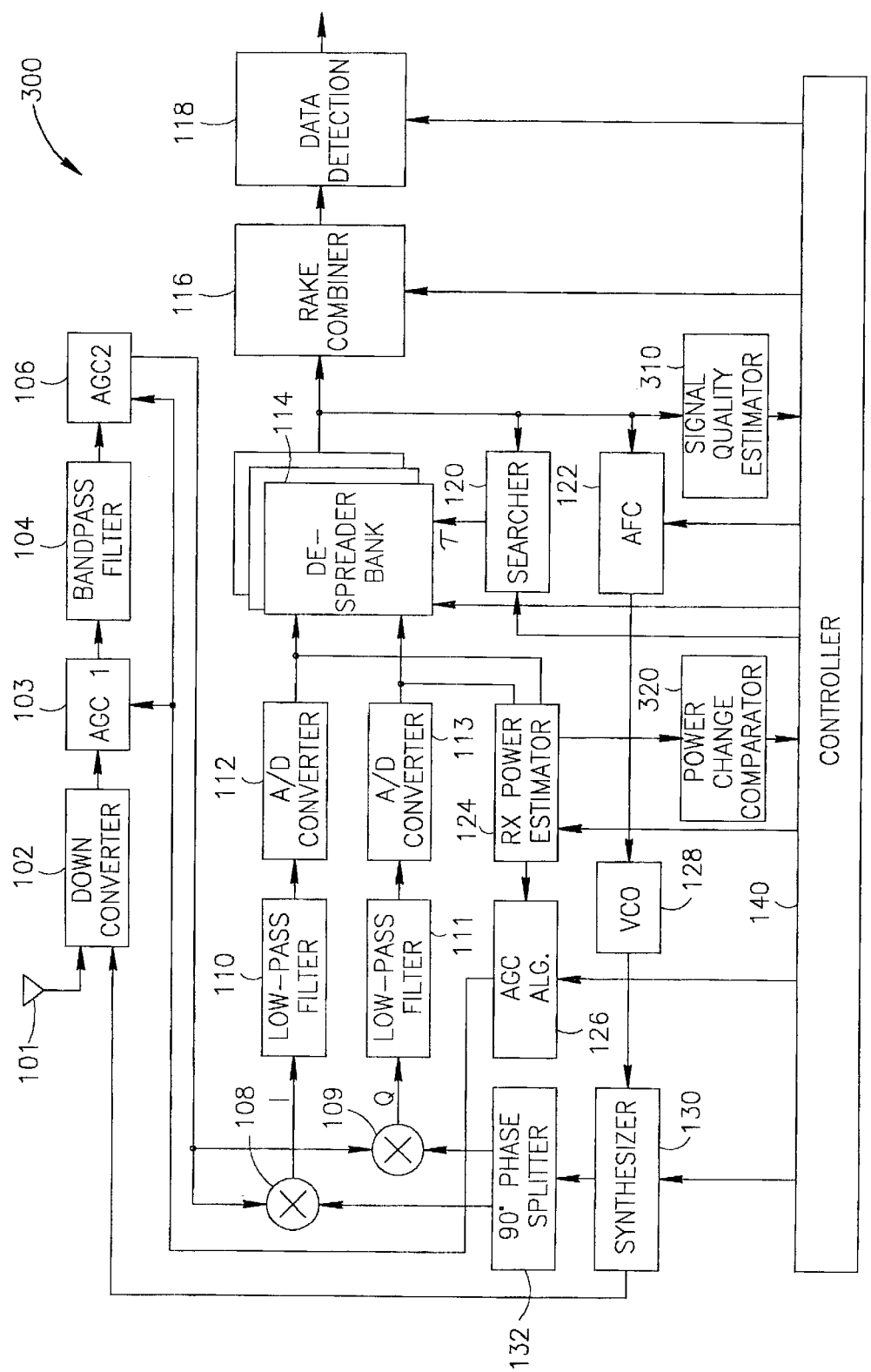
FIG. 3 is a schematic illustration of a CDMA mobile station receiver constructed according to the present invention.

FIG. 3 is a schematic block diagram of a CDMA mobile station receiver 300 constructed In accordance with the present invention. A signal quality estimator 310 Is added between the de-spreader bank 114 outputs and the controller 140. A receive power comparator 320 is added between the received power estimator 124 and the controller 140. Otherwise the receiver of FIG. 3 is basically of the came prior art construction as illustrated in FIG. 1, and therefore its parts are identified by the same reference numerals to facilitate understanding.

Figure 4:
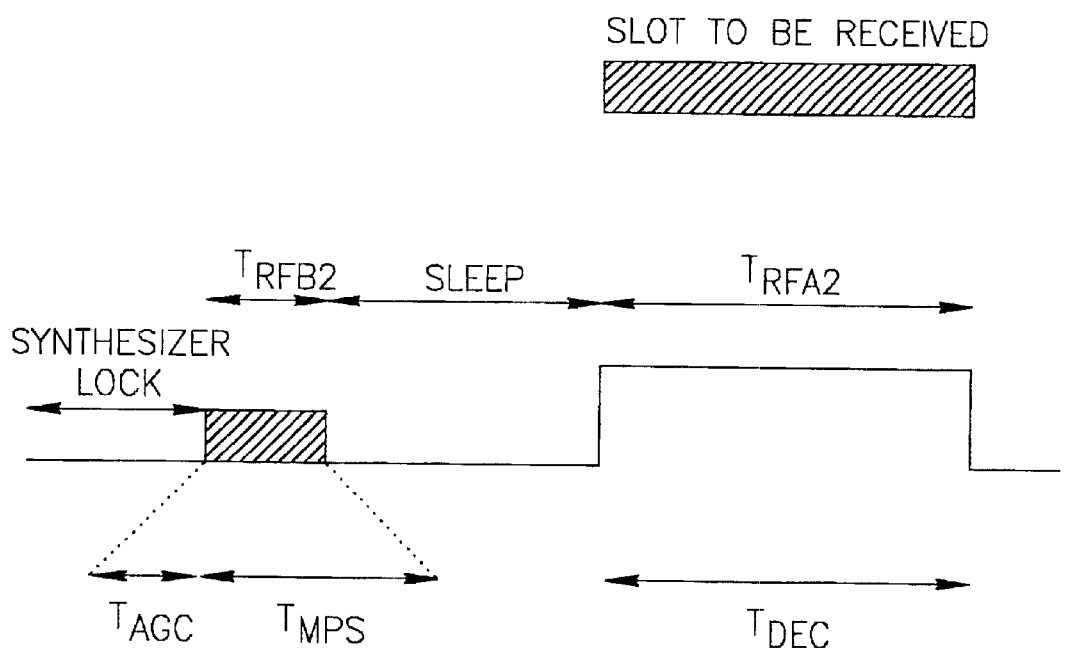
FIG. 4 is a timing diagram of the Standby period in the described embodiments of the present invention.

FIG. 4 is a timing diagram of the FIG. 3 receiver. In FIG. 4 $T_{rfb2}$ is moved to be prior to $T_{rfa2}$. During the period $T_{rfb2}$, a very short verification of the AGC level ($T_{AGC}$) and the received signal timings ($T_{mps}$, fingers positions) takes place. Since in the vast majority of the times, the AGC level and the fingers positions do not vary, or vary very little from their values measured at the previous slot (a few seconds before), $T_{rfb2}$ takes a very short time (less then ~1 ms for IS-95 applications). Frequency tracking ($T_{frs}$) is done during $T_{rfa2}$ in parallel to data decoding ($T_{dec}$).

Figure 5:
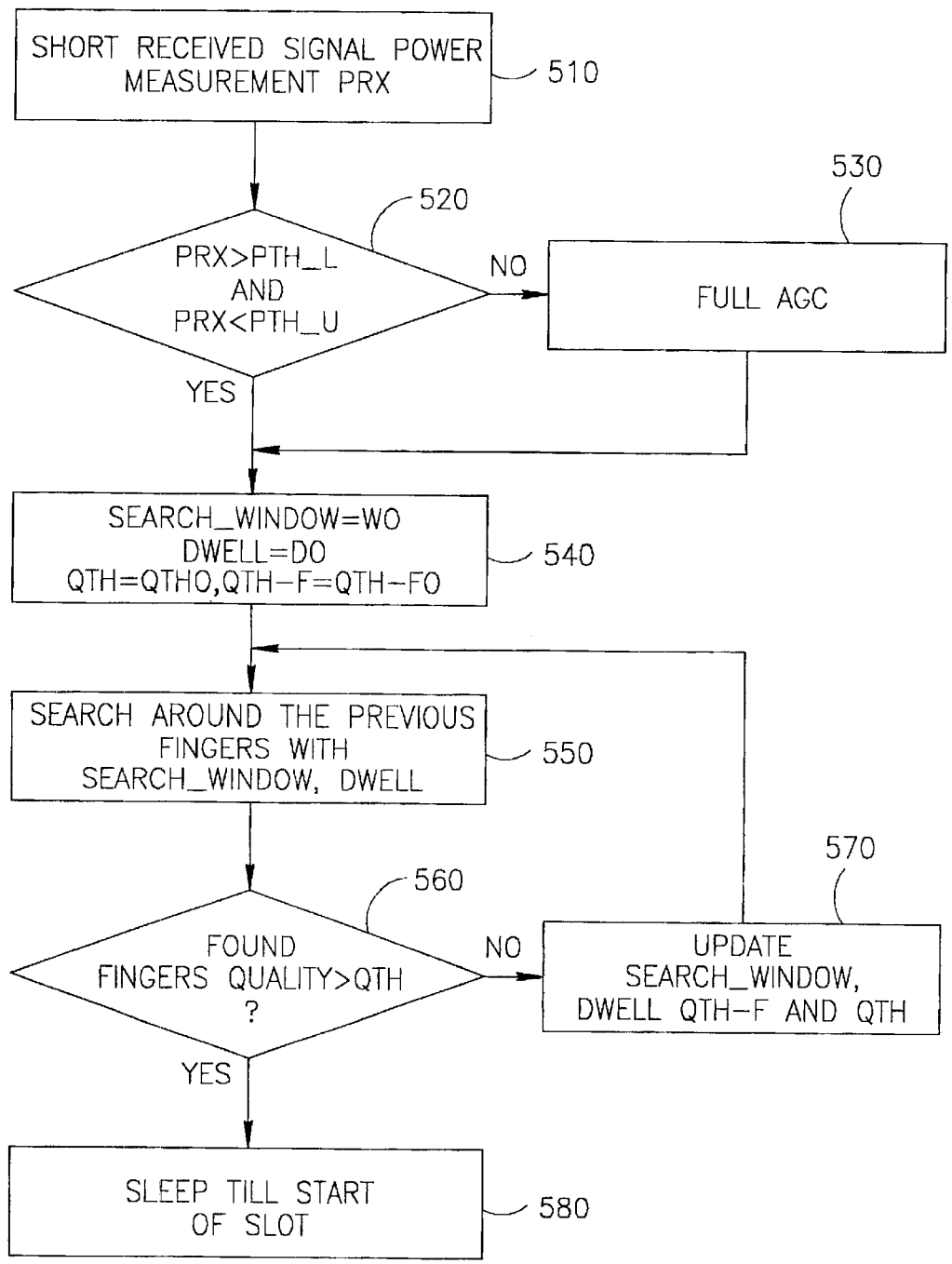
FIG. 5 is a flowchart of one embodiment of the present invention.

FIG. 5 illustrates one mode of operation as controlled by controller 140. First, a very short measurement of the received signal power is taken (block 510). If the newly measured received signal level does not differ considerably from the level for which the received AGC is tuned for (as determined by block 520), no further AGC is needed at this time (block 530). This is verified by comparing the measurement result with the window defined by the upper and lower thresholds $P_{TH-u}$ and $P_{TH-L}$. If this condition is not met by the measured power of the received signal being within the window, full AGC operation is performed ($T_{AGC}$) (block 530).

It will be appreciated that even if the above condition is met and no AGC is performed during the pre-conditioning interval, further AGC operation like power measurements and gain settings can be performed during the data detection time interval in order to improve the gain settings.

Afterwards, the fingers positions known from the previous slots are checked. This is done by setting a relatively short search window $W_0$ around the fingers positions known from the previous slots, or the positions interpolated on the basis of the previously estimated fingers movements (block 540). The window $W_0$ is searched with a time resolution of typically ½ or 1 chip where each position is checked for dwell time of $D_0$ (block 550). All the positions with quality measure that exceed the threshold Qth_fo are declared as having a useful receive path.

Various quality measures can be applied. For example: power estimation of received path:

$$Ep(i)=|R(i)|^2$$

where $$R(i) = \frac{1}{Dwell} \sum_{j=1}^{Dwell} r_j(i) \cdot s_j^*,$$

$r_j(i)$ is the de-spreader output of the jth symbol of the received signal of path i, $S_j$ is the transmitted $j^{th}$ symbol (known to the receiver like in IS-95 pilot channel or estimated by the receiver at other applications) and Ep(i) is the estimated power of path i.

Alternatively, the estimated Signal to noise and interference (SNIR) of each path can serve as a quality measure:

$$SNIR(i) = \frac{Ep(i)}{It(i)}$$

where It(i) is the estimated averaged sum of noise and interference at path i. It(i) can be estimated by:

$$It(i) = \frac{1}{Dwell} \sum_{j=1}^{Dwell} |r_j(i) \cdot S_j^* - R(i)|^2.$$

A quality measure is then applied on the found paths. Various quality measures can be used, for example: estimated sum of powers of all found paths.

$$\sum_{j=1}^{No.\,of\,found\,paths} \frac{Ep(i)}{It(i)},$$

estimated sum of signal to noise and interference ratios on all found paths:

$$\sum_{j=1}^{No.\,of\,found\,paths} Ep(i)$$

Those skilled in the art are aware of a variety of quality measures and methods of generating them.

If this quality measure exceeds a predefined threshold (block 560), the receiver goes into a sleep mode until the slot beginning (block 580). In this sleep mode, all parts of the receiver (RF parts and baseband parts) can be turned off except those parts which are needed for waking up the receiver at the slot start (such as a low power counter). If the quality criteria are not met, the search window around each finger, the dwell time and the quality threshold are updated, and steps 550 to 570 are repeated. Obviously, all thresholds can be adaptive.

Other search methods, such as the one known as "Multiple Dwell Search", can be employed (see for example: "Multiple Dwell Serial Search; Performance and Application to Direct Sequence Code Acquisition" by David M. DiCorlo and Charles I Weber, IEEE Transaction on Communications, VOL. COM-31, No 5, May 1983).

Figure 6:
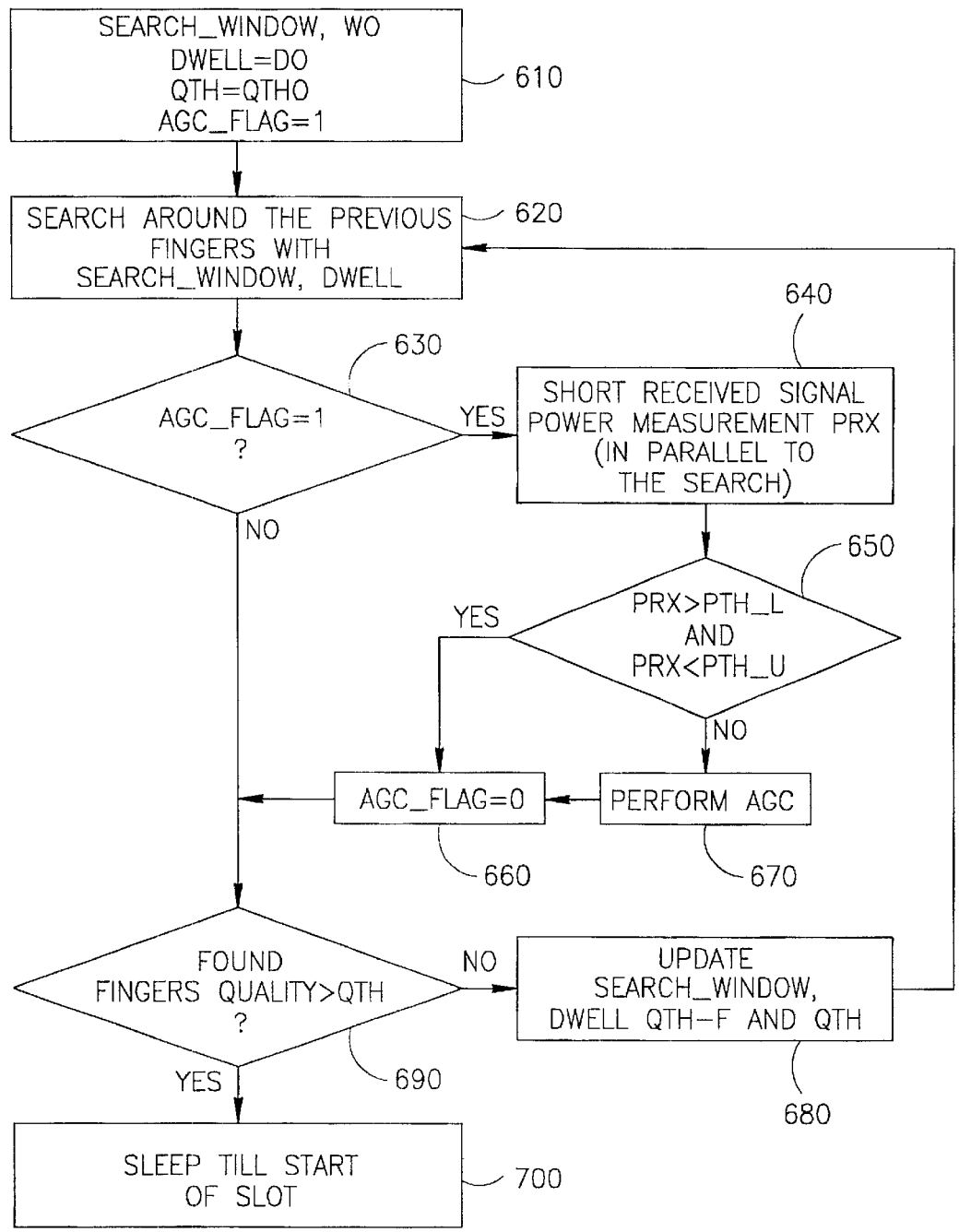
FIG. 6 is a flowchart of another embodiment of the present invention.

FIG. 6 Illustrations another embodiment of the invention, wherein the received signal power measurement 640, the threshold comparison 650, and the AGC 670, are performed concurrently in parallel to the search window of steps 620, 690 and 600.

While the invention has been described with respect to preferred embodiments, it will be appreciated that these are set forth merely for purposes of example, and that many other variations, modifications and applications of the invention may be made.

What is claimed is:

1. A method comprising:
   (a) activating a receive path at a predetermined time instant in a frame before the start of a data-detection time interval of said frame, thus beginning a pre-conditioning period;
   (b) performing during said pre-conditioning period pre-conditioning functions with respect to a receiver;
   (c) detecting during said pre-conditioning period predetermined characteristics of a received signal, said predetermined characteristics affected by one or more of said pre-conditioning functions;

(d) deactivating said receive path at a time instant later than said predetermined time instant until the start of the data-detection time interval, thus terminating said pre-conditioning period prior to the start of said data-detection time interval, and then reactivating said receive path for the data-detection time interval, in the event that said predetermined characteristics are within corresponding thresholds; and (e) in the event that said predetermined characteristics are outside said corresponding thresholds repeating stems (b) and (c) until stet) (d) can be performed.

2. The method according to claim 1, wherein said pre-conditioning functions include an automatic gain control (AGC) function, and one of said predetermined characteristics affected thereby is a measurement of the power of the received signal.

3. The method according to claim 2, wherein said threshold of the AGC function is a window defined by maximum and minimum powers of the received signal.

4. The method according to claim 3, wherein said receiver is a "RAKE" receiver, and said multipath search function is a finger-positioning function.

5. The method according to claim 1, wherein said pre-conditioning functions include a multipath search function, and one of said predetermined characteristics affected thereby is a measurement of the quality of the received signal.

6. The method according to claim 5, wherein said threshold of the multipath search function is based on the sum of the signal to noise and interference ratios of all found paths.

7. The method according to claim 1, wherein said pre-conditioning functions include: an automatic gain control (AGC) function, wherein one of said predetermined characteristics affected thereby is a measurement of the power of said received signal; and a multipath search function, wherein one of said predetermined characteristics affected thereby is a measurement of the quality of the received signal.

8. The method according to claim 7, wherein said multipath search function is performed immediately following said automatic gain control function.

9. The method according to claim 7, wherein said multipath search function is performed concurrently with said automatic gain control function.

10. The method according to claim 7, wherein said preconditioning functions also include a frequency tracking function which is performed during said data-detection time interval.

11. A portable radio receiver comprising:
data-detection circuitry in a receive path adapted to detect data destined for a selected receiver;
pre-conditioning circuitry in said receive path adapted to pre-condition said radio receiver using pre-conditioning functions during a pre-conditioning period; and
control circuitry coupled to said data-detection circuitry and said pre-conditioning circuitry, said control circuitry adapted to activate said receive path for said pre-conditioning period, to deactivate at least a part of said receive path during a time interval in a frame that precedes a data-detection time interval of said frame thus terminating said pre-conditioning period prior to said data-detection time interval when predetermined characteristics of a signal received during said frame are within corresponding thresholds and to reactivate said receive path for said data-detection time interval, each of said predetermined characteristics affected by one or more of said preconditioning functions.

12. The radio receiver according to claim 11, wherein said pre-conditioning circuitry includes an automatic gain control (AGC) circuit, and said control circuitry includes a received power comparator for comparing the power of the received signal against upper and lower thresholds.

13. The radio receiver according to claim 12, wherein said control circuitry is adapted to define a window threshold of maximum and minimum powers for controlling the AGC circuit.

14. The radio receiver according to claim 13, wherein said receiver is a "RAKE" receiver, and said multipath search circuit is a finger-positioning circuit.

15. The radio receiver according to claim 11, wherein said pre-conditioning circuitry includes a multipath search circuit, and said control circuitry includes a signal quality estimator for measuring the quality of the received signal.

16. The radio receiver according to claim 15, wherein said control circuitry is adapted to define a threshold for the multipath search circuit based on the sum of the signal to noise and interference ratios of all found paths.

17. The radio receiver according to claim 11, wherein said pre-conditioning circuits include an automatic gain control (AGC) circuit, wherein one of said predetermined characteristics is a measurement of the power of the received signal; and a multipath search circuit, wherein one of said predetermined characteristics is a measurement of the quality of the received signal.

18. The radio receiver according to claim 17, wherein said control circuitry is adapted to effect an automatic gain control function and to effect a multipath search function immediately afterwards.

19. The radio receiver according to claim 17, wherein said control circuitry is adapted to effect a multipath search function and an automatic gain control function concurrently.

20. The radio receiver according to claim 17, wherein said pre-conditioning circuitry also include a frequency tracking circuit which is controlled by said control circuitry to operate during said data-detection time interval.

21. A method comprising activating a receive path of a receiver at a predetermined time instant in a frame before the start of a data detection time interval of said frame, thus beginning a conditioning period comprising:
during said pre-conditioning period, estimating predetermined characteristics of a signal received by said receiver during said frame, said predetermined characteristics affected by pre-conditioning functions performed on said receiver during said pre-conditioning period; and
deactivating at least part of said receive path until the start of said data-detection time interval, thus terminating said pre-conditioning period prior to the start of said data-detection time interval, in the event that said predetermined characteristics are within corresponding thresholds.

22. The method of claim 21, wherein said pre-conditioning functions include an automatic gain control function, and wherein estimating said predetermined characteristics comprises estimating an estimated power of said signal.

23. The method of claim 21, wherein said pre-conditioning functions include a multipath search function, and wherein estimating said predetermined characteristics comprises determining an estimated signal-to-noise-and-interference of said signal.

24. A portable radio receiver comprising:
- data-detection circuitry in a receive path adapted to detect data destined for a selected receiver;
- pre-conditioning circuitry in said receive path adapted to pre-condition said radio receiver using pre-conditioning functions during a pre-conditioning period; and
- control circuitry coupled to said data-detection circuitry and said pre-conditioning circuitry, said control circuitry able to activate said receive path for said pre-conditioning period and to deactivate at least part of said receive path until the start of a data-detection time interval of a frame thus terminating said pre-conditioning period prior to said data-detection time interval when predetermined characteristics of a signal received by said receive path during said frame are within corresponding thresholds, each of said predetermined characteristics affected by one or more of said preconditioning functions.

25. The receiver of claim 24, wherein said pre-conditioning functions include an automatic gain control function, and wherein said predetermined characteristics include an estimated power of said signal.

26. The receiver of claim 24, wherein said pre-conditioning functions include a multipath search function, and wherein said predetermined characteristics include an estimated signal-to-noise-and-interference of said signal.

* * * * *